United States Patent [19]

Itokazu et al.

[11] Patent Number: 4,925,898

[45] Date of Patent: May 15, 1990

[54] ETHYLENE PROPYLENE RUBBER WITH POLYACRYLATES AND SULFUR

[75] Inventors: Yuji Itokazu; Koichi Nishihira, both of Hyogo, Japan

[73] Assignee: Bando Chemical Industries, Ltd., Kobe, Japan

[21] Appl. No.: 243,046

[22] Filed: Sep. 12, 1988

[51] Int. Cl.$^5$ .................... C08F 179/00; C08F 255/04
[52] U.S. Cl. ..................................... 525/305; 525/245; 525/261
[58] Field of Search ...................... 525/281, 305, 331.8, 525/333.8

[56] References Cited

U.S. PATENT DOCUMENTS 4,569,382  2/1986  Maxey ................................. 525/281
4,594,376  6/1986  Hamada ............................... 524/101

FOREIGN PATENT DOCUMENTS 116712   9/1981  Japan ................................... 525/281
898264   6/1962  United Kingdom ................. 525/345

Primary Examiner—Christopher Henderson
Attorney, Agent, or Firm—Wenderoth, Lind & Ponack

[57] ABSTRACT

An ethylene propylene rubber mixture highly adhesive to zinc-plated metals and a heat resistant ethylene propylene rubber conveyor belt having load-carrying zinc-plated steel cords embedded therein are disclosed.

The heat resistant conveyor belt composed of (a) an outer covering rubber layer and an inner covering rubber layer both of an ethylene propylene rubber and (b) an adhesive rubber layer having load-carrying zinc-plated steel cords embedded therein parallel to each other at a distance therebetween in the longitudinal direction of the belt, the adhesive rubber layer being disposed between the covering rubber layers and bonded integrally to the covering rubber layers, the adhesive rubber comprising: an ethylene propylene rubber, an organic peroxide, a cross-linking aid, a cobalt salt of organic carboxylic acids, and sulfur.

2 Claims, No Drawings

ETHYLENE PROPYLENE RUBBER WITH POLYACRYLATES AND SULFUR

This invention relates to an ethylene propylene rubber mixture and a heat resistant conveyor belt produced using the same. More particularly, the invention relates to an ethylene propylene rubber mixture improved in adhesion to zinc-plated metals such as zinc-plated steel cords, and further to a heat resistant conveyor belt which has load-carrying zinc-plated steel cords embedded therein and bonded thereto by use of such a rubber mixture as an adhesive rubber.

A conveyor belt which is made of ethylene propylene rubber cross-linked with organic peroxides and contains duck in layers as load-carrying members enveloped therein finds wide applications where heat resistance of the belt is required on account of a high durability at high temperatures of the rubber. However, as a request for a conveyor belt longer and higher in tensile strength is increasing, steel cords have very recently come to be preferred to duck.

In a steel cord reinforced belt, the steel cords are embedded usually as zinc-plated cords longitudinally along the length of the belt in vulcanized rubber. It is already known that a diene rubber can be directly bonded to zinc-plated steel cords by vulcanization or organic peroxide cross-linking of the rubber containing cobalt salts of organic carboxylic acids both as a vulcanizing agent and an adhesive. However, ethylene propylene rubber, if it contains cobalt salts of organic carboxylic acids, can not be bonded directly to zinc-plated steel cords by organic peroxide cross-linking.

Therefore, in the production of zinc-plated steel cord reinforced conveyor belt, there has been utilized an adhesive rubber composed of a mixture of ethylene propylene diene rubber and styrene butadiene rubber containing therein sulfur and cobalt salts of organic carboxylic acids. More specifically, zinc-plated steel cords are placed between sheets of the adhesive rubber, and then sheets of covering rubber composed of ethylene propylene rubber containing organic peroxides therein are placed on both the outer sides of the adhesive rubber sheets, and the resultant sheets in layers are vulcanized under heating and pressures.

The thus obtained belts, however, are inferior in heat resistance and become stiff in a short period of time in use, and moreover, the adhesion between the adhesive rubber layer and covering rubber layer is insufficient. Accordingly the covering rubber layer and the adhesive rubber layer tend to separate from each other, or cracks tend to be generated in the adhesive rubber layer during the use in a high temperature environment. Namely, the belt is very short in life and has no durability required in use at high temperatures.

A further zinc-plated steel cord reinforced conveyor belt has been also proposed, in which a mixture of ethylene propylene diene rubber and chlorinated ethylene propylene diene rubber is used as an adhesive rubber and ethylene propylene rubber is used as a covering rubber. This conveyor belt is still found insufficient in heat resistance and durability.

It is, therefore, an object of the invention to provide a novel ethylene propylene rubber mixture which is highly adhesive to zinc-plated metals, for example, zinc-plated steel cords.

It is a further object of the invention to provide a heat resistant and durable ethylene propylene rubber conveyor belt which has zinc-plated steel cords embedded therein utilizing such a rubber mixture as an adhesive rubber.

The ethylene propylene rubber mixture which is highly adhesive to zinc-plated metals of the invention comprises: an ethylene propylene rubber, an organic peroxide as a cross-linking agent in amounts of about 0.01-0.02 moles per 100 g of the ethylene propylene rubber, a cross-linking aid in amounts of about 0.01-0.02 moles per 100 g of the ethylene propylene rubber, a cobalt salt of organic carboxylic acids in amounts of about 0.2-0.5% by weight as metallic cobalt based on the rubber mixture, and either sulfur, an organic polysulfide or a mixture of these in amounts of about 0.2-0.4% by weight based on the rubber mixture.

The ethylene propylene rubber used in the invention includes an ethylene propylene rubber (EPM) in the narrow sense, ethylene propylene diene rubber (EPDM) and a mixture of these. A mixture of EPM in amounts of about 10-90% by weight and EPDM in amounts of about 90-10% by weight is particularly preferred in the invention. A portion of the ethylene propylene rubber may be displaced by other rubbers in amounts not adversely affecting the improved adhesion characteristics of the rubber mixture of the invention.

The rubber mixture of the invention contains as a vulcanizing agent an organic peroxide, which is exemplified by dicumylperoxide, 1,1-bis(t-butylperoxy)-3,3,5-trimethylcyclohexane, 2,5-dimethyl-2,5-di(t-butylperoxy)hexane, 2,5-dimethyl-2,5-di(t-butylperoxy)hexyne-3 and 2,5-dimethyl-2,5-di(benzoylperoxy)hexane, but is not limited to these. The organic peroxide is contained in the rubber mixture in amounts of 0.01-0.02 moles per 100 g of the ethylene propylene rubber used.

The cross-linking aid or auxiliary used in the invention includes polyhydric alcohol polyesters of acrylic acid or methacrylic acid, such as ethylene glycol diacrylate, ethylene glycol dimethacrylate, propylene glycol diacrylate, propylene glycol dimethacrylate, 1,4-butylene glycol diacrylate, 1,4-butylene glycol dimethacrylate, trimethylolpropane trimethacrylate. Triallylisocyanurate is also usable as a cross-linking aid. The cross-linking aid is contained in the rubber mixture in amounts of about 0.01-0.02 moles per 100 g of the ethylene propylene rubber used.

The rubber mixture of the invention further contains a cobalt salt of organic carboxylic acids as an adhesive, and sulfur or an organic polysulfide as an adhesion aid, the terms the adhesive and the adhesion aid used herein being for convenience only since the adhesion mechanism involved in the invention is not yet completely clear. The cobalt salt of organic carboxylic acids preferably used in the invention includes naphthenic acid salts and aliphatic carboxylic salts. More specifically, therefore, cobalt naphthenate, cobalt octylate, cobalt stearate, cobalt palmitate, cobalt neodecanoate or the like is preferred. A mixture of two or more of these may be used. The cobalt salt is contained in the rubber mixture in amounts of about 0.2-0.5% by weight as metallic cobalt based on the weight of the rubber mixture.

The sulfur used in the invention is not specifically limited, but includes, for example, powdered sulfur and insoluble sulfur. The organic polysulfide used herein is such an organic compound as liberates sulfur when being heated, and includes, for example, morpholine disulfide, alkylphenol disulfides, thiuram polysulfides such as tetramethylthiuram disulfide, tetraethylthiuram disulfide, tetrabutylthiuram disulfide, dipentamethylenethiuram disulfide, dipentamethylenethiuram tetrasulfide and 2-(4-morpholino)benzothiazole. The sulfur or the organic polysulfide is contained in the rubber mixture in amounts of about 0.2–0.4% by weight, preferably of about 0.30–0.35% by weight, based on the weight of the rubber mixture.

The rubber mixture of the invention may further contain a conventional adhesive composed of a combination of a methylene donor such as alkylphenols and a methylene acceptor such as hexamethylenetetramine, together with, if needed, usual rubber chemicals such as antioxidants, reinforcements, e.g., inorganic or organic fibers, accelerator activators e.g., zinc oxide or stearic acid or zinc salt thereof, fillers, softners or processing aids.

The rubber mixture of the invention accieves a high adhesion to zinc-plated metals, for example, zinc-plated steel cords, by vulcanization, and further the resultant composite is of high heat resistance or durable at high temperatures. Therefore, the rubber mixture is advantageous for use as an adhesive rubber in the production of a heat resistant ethylene propylene rubber conveyor belt which contains ethylene propylene covering rubber and has zinc-plated steel cords as load-carrying members embedded therein to bond the cords to the ethylene propylene covering rubber. The cross-linking aid as hereinbefore described is particularly useful to improve the resistance to thermal aging or deterioration of the adhesion of ethylene propylene rubber to zinc-plated steel cords.

Therefore, as a further aspect of the invention, there is provided a heat resistant conveyor belt composed of (a) an outer and an inner covering rubber layer both of an ethylene propylene rubber and (b) an adhesive rubber layer between the covering rubber layers, the belt having load-carrying zinc-plated steel cords embedded therein parallel to each other at a distance therebetween in the longitudinal direction of the belt, which comprises: the zinc-plated steel cords enveloped in the adhesive rubber layer and bonded to the covering rubber layers integrally, the adhesive rubber comprising an ethylene propylene rubber, an organic peroxide, a cross-linking aid, a cobalt salt of organic carboxylic acids, and either sulfur, an organic polysulfide or a mixture of these.

More specifically, the heat resistant conveyor belt of the invention composed of (a) an outer and an inner covering rubber layer both of an ethylene propylene rubber and (b) an adhesive rubber layer having load-carrying zinc-plated steel cords embedded therein parallel to each other at a distance therebetween in the longitudinal direction of the belt, the adhesive rubber layer being disposed between the covering rubber layers and bonded integrally to the covering rubber layers, the adhesive rubber comprising: an ethylene propylene rubber, an organic peroxide in amounts of about 0.01–0.02 moles per 100 g of the ethylene propylene rubber, a cross-linking aid in amounts of about 0.01–0.02 moles per 100 g of the ethylene propylene rubber, a cobalt salt of organic carboxylic acids in amounts of about 0.2–0.5% by weight as metallic cobalt based on the rubber mixture, and either sulfur or an organic polysulfide or a mixture of these in amounts of about 0.2–0.4% by weight based on the rubber mixture.

In the production of the conveyor belt, the covering rubber and the adhesive rubber are used usually in the form of sheet. The zinc-plated steel cords are placed between the adhesive rubber sheets parallel to each other at a distance therebetween in the longitudinal direction of the belt, and the covering rubber sheets are placed on either outer sides of the adhesive rubber sheets, and then the covering sheets and the adhesive sheets in layers are vulcanized under heating and pressures in accordance with conventional methods known in the art of ethylene propylene rubber.

The thus obtained conveyor belt has zinc-plated steel cords embedded therein and directly bonded with a high adhesive force to the ethylene propylene rubber, so that the belt is of high heat resistance and durability.

The invention will now be more fully described with reference to examples, to which, however, the invention is not limited.

EXAMPLES 1–7

A rubber compound was prepared composed of (in parts by weight): 100 parts of ethylene propylene rubber (EPM by Japan Synthetic Rubber Co., Ltd.), 5 parts of zinc oxide, 2.7 parts of dicumylperoxide, 2 parts of ethylene glycol dimethacrylate, 40 parts of HAF carbon black, 5 parts of paraffin oil and 2 parts of an antioxidant.

The rubber compound was calendered to covering rubber sheets of 6.7 mm in thickness, while the rubber compounds as shown in Table 1 were calendered to adhesive rubber sheets of 2.7 mm in thickness, respectively.

A plurality of zinc-plated steel cords of 4.6 mm in diameter were placed parallel to each other at a distance of 13 mm between the adhesive rubber sheets, and then the covering rubber sheets were placed on either outer sides of the adhesive rubber sheets. Then the thus layered sheets were vulcanized under heating at 160° C. for 40 minutes under a pressure of 25 kg/cm$^2$, to provide a conveyor belt.

A test specimen was prepared according to the JIS K 6319 method, and pulling strength or adhesion at an initial stage and after a forced thermal aging at heating 165° C. for 225 minutes. The results are shown in Table 1.

REFERENCE EXAMPLES 1–4

Without the use either or all of the cross-linking aids, cobalt salts and sulfur, and otherwise in the same manner as in the above examples, adhesive rubber sheets were prepared. Conveyor belts were produced using the above adhesive rubber sheets in the same manner as in the examples. The pulling strength of the cords at the initial stage and after the same thermal aging as above set forth are shown in Table 1.

REFERENCE EXAMPLES 5 AND 6

Using the adhesive rubber sheets composed of a mixture of ethylene propylene diene rubber and styrene butadiene rubber and a mixture of ethylene propylene diene rubber and chlorinated ethylene propylene diene rubber, respectively, as shown in Table 2, conveyor belts were produced in the same manner as in the examples. The pulling strength at the initial stage and after the thermal aging are shown in Table 2.

As will be apparent in Reference Example 1, the belt prepared by use of an adhesive rubber which contains neither cobalt salts nor sulfur has a very small pulling adhesion of zinc-plated steel cords.

TABLE 1

|  | Reference Examples | | Examples | | | | | Reference Examples | | Examples | |
| --- | --- | --- | --- | --- | --- | --- | --- | --- | --- | --- | --- |
|  | 1 | 2 | 1 | 2 | 3 | 4 | 5 | 3 | 4 | 6 | 7 |
| Rubber Compounds (parts by weight) | | | | | | | | | | | |
| EP-11[1] | 50 | 50 | 50 | 50 | 50 | 50 | 50 | 50 | 50 | 75 | 25 |
| EP-33[2] | 50 | 50 | 50 | 50 | 50 | 50 | 50 | 50 | 50 | 25 | 75 |
| Zinc oxide | 5 | 5 | 5 | 5 | 5 | 5 | 5 | 5 | 5 | 5 | 5 |
| Stearic acid | 1 | 1 | 1 | 1 | 1 | 1 | 1 | 1 | 1 | 1 | 1 |
| Antioxidant | 0.5 | 0.5 | 0.5 | 0.5 | 0.5 | 0.5 | 0.5 | 0.5 | 0.5 | 0.5 | 0.5 |
| Dicumylperoxide | 3.2 | 3.2 | 3.2 | 3.2 | 3.2 | 3.2 | 3.2 | 3.2 | 3.2 | 3.2 | 3.2 |
| Cobalt neodecanoate | — | 5 | 5 | 5 | 5 | 7 | 9 | 7 | 7 | 7 | 7 |
| EGDMA[3] | 2.5 | 2.5 | 2.5 | 2.5 | 2.5 | 2.5 | 2.5 | — | 2.5 | 2.5 | 2.5 |
| Sulfur | — | — | 0.3 | 0.7 | 1.1 | 0.7 | 0.7 | 0.7 | — | 0.7 | 0.7 |
| Carbon Black | 80 | 80 | 80 | 80 | 80 | 80 | 80 | 80 | 80 | 80 | 80 |
| Processing oil | 10 | 10 | 10 | 10 | 10 | 10 | 10 | 10 | 10 | 10 | 10 |
| Belt Properties, Initial stage | | | | | | | | | | | |
| Cord pulling strength (Kg/5 cm) | 180 | 320 | 480 | 550 | 480 | 555 | 560 | 540 | 315 | 480 | 570 |
| Rubber adhesion on the cord[4] (%) | 0 | 50 | 80 | 100 | 100 | 100 | 100 | 100 | 50 | 100 | 100 |
| Belt Properties, After thermal aging[5] | | | | | | | | | | | |
| Cord pulling strength (kg/5 cm) | — | 310 | 470 | 535 | 520 | 530 | 535 | 420 | 310 | 475 | 520 |
| Rubber adhesion on the cord[4] (%) | — | 40 | 70 | 90 | 90 | 90 | 90 | 60 | 40 | 90 | 90 |

Notes:
[1]EPM by Japan Synthetic Rubber Co., Ltd.
[2]EPDM by Japan Synthetic Rubber Co., Ltd.
[3]Ethylene glycol dimethacrylate
[4]Percentage of the surface of cords covered with rubber after pulling out from the belt.
[5]Heated at 165° C. for 225 minutes

TABLE 2

|  | Reference 5 | Examples 6 |
| --- | --- | --- |
| Rubber Compounds (parts by weight) | | |
| EP-35[1] | 60 | 85 |
| SBR 1500[2] | 40 | — |
| Chlorinated EPDM[3] | — | 15 |
| Zinc oxide | 5 | 5 |
| Accelerator | 1.5 | 1 |
| Antioxidant | 1 | 1 |
| Stearic acid | 1 | 0.5 |
| Cobalt neodecanoate | 5 | 5 |
| Sulfur | 1.2 | 1.2 |
| Carbon black | 80 | 80 |
| Processing oil | 20 | 10 |
| Belt Properties, Initial stage | | |
| Cord pulling strength (kg/5 cm) | 410 | 420 |
| Rubber adhesion on the cord[4] (%) | 70 | 80 |
| Belt Properties, After thermal aging[5] | | |
| Cord pulling strength (kg/5 cm) | 350 | 300 |
| Rubber adhesion on the cord[4] (%) | 50 | 40 |

Notes:
[1]EPDM by Japan Synthetic Rubber Co., Ltd.
[2]Styrene butadiene rubber by Japan Synthetic Rubber Co., Ltd.
[3]Chlorinated EPDM by Japan Synthetic Rubber Co., Ltd.
[4]Percentage of the surface of cords covered with rubber after pulling out from the belt.
[5]Heated at 165° C. for 225 minutes as is seen in Reference Example 2, the use of cobalt salts in the adhesive rubber improves to a degree the pulling adhesion of the cords, but the adhesion is still insufficient, whereas the belt prepared without the use of cross-linking aids in Reference Example 3 is improved in pulling adhesion of the cords at the initial stage, but still small after the thermal aging, thus is inferior in heat resistance. When an adhesive rubber containing a cross-linking aid but no sulfur therein is used, the resultant belt is much inferior in adhesion and heat resistance as seen in Reference Example 4.

As is further shown in Table 2, the use of adhesive rubbers composed either of a mixture of ethylene propylene diene rubber and styrene butadiene rubber or a mixture of ethylene propylene diene rubber and chlorinated ethylene propylene diene rubber fails to provide a conveyor belt which has high adhesion to zinc-plated steel cords and is of high heat resistance.

The adhesion rate of the rubber to the surface of the cord is also small in the belts of Reference Examples, illustrating that the adhesion between the rubber and the cord is insufficient and rather separable.

On the contrary, the pulling adhesion of zinc-plated steel cords in the conveyor belts according to the invention are very high even after the thermal aging. Further, the adhesion rate of the rubber to the surface of the cord is much larger, illustrating that the adhesive rubber of the invention is highly adhesive to zinc-plated steel cords even at high temperatures.

What is claimed is:

1. An ethylene propylene rubber mixture highly adhesive to zinc-plated metals which comprises: an ethylene propylene rubber; an organic peroxide as a cross-linking agent in amounts of about 0.01–0.02 moles per 100 g of the ethylene propylene rubber; a polyhydric alcohol polyester of acrylic or methacrylic acid in amounts of about 0.01–0.02 moles per 100 g of the ethylene propylene rubber; a cobalt salt of an organic carboxylic acid in an amount of about 0.2–0.5% by weight as metallic cobalt based on the rubber mixture; and sulfur in an amount of about 0.2–0.4% by weight based on the rubber mixture.

2. The ethylene propylene rubber mixture as claimed in claim 1 wherein the ethylene propylene rubber is a mixture of ethylene propylene rubber (EPM) in amounts of about 10–90% by weight and ethylene propylene diene rubber (EPDM) in amounts of about 90–10% by weight.

* * * * *